(12) United States Patent
Hirata

(10) Patent No.: US 11,433,810 B2
(45) Date of Patent: Sep. 6, 2022

(54) IMAGE PROCESSING APPARATUS, CAMERA, MOVEABLE BODY, AND IMAGE PROCESSING METHOD

(71) Applicant: KYOCERA Corporation, Kyoto (JP)

(72) Inventor: Akifumi Hirata, Sagamihara (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/287,745

(22) PCT Filed: Oct. 2, 2019

(86) PCT No.: PCT/JP2019/039011
§ 371 (c)(1),
(2) Date: Apr. 22, 2021

(87) PCT Pub. No.: WO2020/090339
PCT Pub. Date: May 7, 2020

(65) Prior Publication Data
US 2021/0394675 A1 Dec. 23, 2021

(30) Foreign Application Priority Data
Oct. 29, 2018 (JP) .............................. JP2018-203062

(51) Int. Cl.
*B60R 1/00* (2022.01)
*G01C 21/00* (2006.01)
*G06V 20/58* (2022.01)
*G08B 5/22* (2006.01)
*H04N 5/272* (2006.01)

(52) U.S. Cl.
CPC ............ *B60R 1/00* (2013.01); *G01C 21/3826* (2020.08); *G06V 20/58* (2022.01); *G08B 5/22* (2013.01); *H04N 5/272* (2013.01); *B60R 2300/301* (2013.01); *B60R 2300/8086* (2013.01)

(58) Field of Classification Search
None
See application file for complete search history.

(56) References Cited

U.S. PATENT DOCUMENTS 7,058,207 B2 6/2006 Iida et al.
10,282,915 B1 * 5/2019 Lin .......................... G06T 17/00
(Continued)

FOREIGN PATENT DOCUMENTS

| CN | 1371079 A | 9/2002 |
|----|-----------|--------|
| EP | 1403138 A1 | 3/2004 |

(Continued)

*Primary Examiner* — Rebecca A Volentine
(74) *Attorney, Agent, or Firm* — Studebaker & Brackett PC

(57) ABSTRACT

An image processing apparatus (10) includes an interface (12) configured to acquire a surrounding image of a moveable body (1) and a processor (12) configured to overlay a display indicating a course trajectory of a specific portion of the moveable body (1) in a travel direction of the moveable body (1) on the surrounding image at a position corresponding to the height of the specific portion from a road surface (3). The processor (12) is configured to change the display indicating the course trajectory when an obstacle, included in the surrounding image and present in the travel direction of the moveable body (1), and the course trajectory of the specific portion are in contact.

11 Claims, 14 Drawing Sheets

(56) References Cited

U.S. PATENT DOCUMENTS

| | | | |
|---|---|---|---|
| 2002/0110262 A1* | 8/2002 | Iida | B62D 15/0295 |
| | | | 382/104 |
| 2005/0231341 A1 | 10/2005 | Shimizu | |
| 2012/0327239 A1 | 12/2012 | Inoue et al. | |
| 2014/0340510 A1* | 11/2014 | Ihlenburg | H04N 7/18 |
| | | | 348/118 |
| 2015/0073664 A1 | 3/2015 | Petridis et al. | |
| 2019/0009719 A1* | 1/2019 | Kondo | B60R 1/00 |

FOREIGN PATENT DOCUMENTS

| JP | H11-334470 A | 12/1999 |
|---|---|---|
| JP | 2004-114977 A | 4/2004 |
| JP | 2004-147083 A | 5/2004 |

* cited by examiner

IMAGE PROCESSING APPARATUS, CAMERA, MOVEABLE BODY, AND IMAGE PROCESSING METHOD

CROSS-REFERENCE TO RELATED APPLICATION

The present application claims priority to Japanese Patent Application No. 2018-203062 filed Oct. 29, 2018, the entire contents of which are incorporated herein by reference.

TECHNICAL FIELD

The present disclosure relates to an image processing apparatus, a camera, a moveable body, and an image processing method.

BACKGROUND

A known technology relates to displaying a predicted trajectory in overlay on an image of the area behind a vehicle when the vehicle is in reverse. The predicted trajectory is the trajectory traversed by the left and right wheels of the vehicle. This technology overlays the predicted trajectory in a ladder shape at constant intervals on the image of the area behind the vehicle, enabling the driver to recognize distance.

SUMMARY

An image processing apparatus according to an embodiment includes an interface configured to acquire a surrounding image of a moveable body and a processor configured to overlay a display indicating a course trajectory of a specific portion of the moveable body in a travel direction of the moveable body on the surrounding image at a position corresponding to a height of the specific portion from a road surface. The processor is configured to change the display indicating the course trajectory when an obstacle, included in the surrounding image and present in the travel direction of the moveable body, and the course trajectory of the specific portion are in contact.

A camera according to the present disclosure includes an imaging optical system, an image sensor configured to capture an image formed via the imaging optical system, an interface configured to acquire a surrounding image, captured by the image sensor, of a moveable body, and a processor configured to overlay a display indicating a course trajectory of a specific portion of the moveable body in a travel direction of the moveable body on the surrounding image at a position corresponding to a height of the specific portion from a road surface. The processor is configured to change the display indicating the course trajectory when an obstacle, included in the surrounding image and present in the travel direction of the moveable body, and the course trajectory of the specific portion are in contact.

A moveable body according to an embodiment of the present disclosure includes a display and a camera configured to image a surrounding area of the moveable body. The camera includes an imaging optical system, an image sensor configured to capture an image formed via the imaging optical system, an interface configured to acquire a surrounding image, captured by the image sensor, of the moveable body, and a processor configured to overlay a display indicating a course trajectory of a specific portion of the moveable body in a travel direction of the moveable body on the surrounding image at a position corresponding to a height of the specific portion from a road surface and display the surrounding image on the display. The processor is configured to change the display indicating the course trajectory when an obstacle, included in the surrounding image and present in the travel direction of the moveable body, and the course trajectory of the specific portion are in contact.

An image processing method according to an embodiment of the present disclosure is an image processing method to be performed by an image processing apparatus and includes acquiring a surrounding image of a moveable body, overlaying a display indicating a course trajectory of a specific portion of the moveable body in a travel direction of the moveable body on the surrounding image at a position corresponding to a height of the specific portion from a road surface, and changing the display indicating the course trajectory when an obstacle, included in the surrounding image and present in the travel direction of the moveable body, and the course trajectory of the specific portion are in contact.

DETAILED DESCRIPTION

Figure 1:
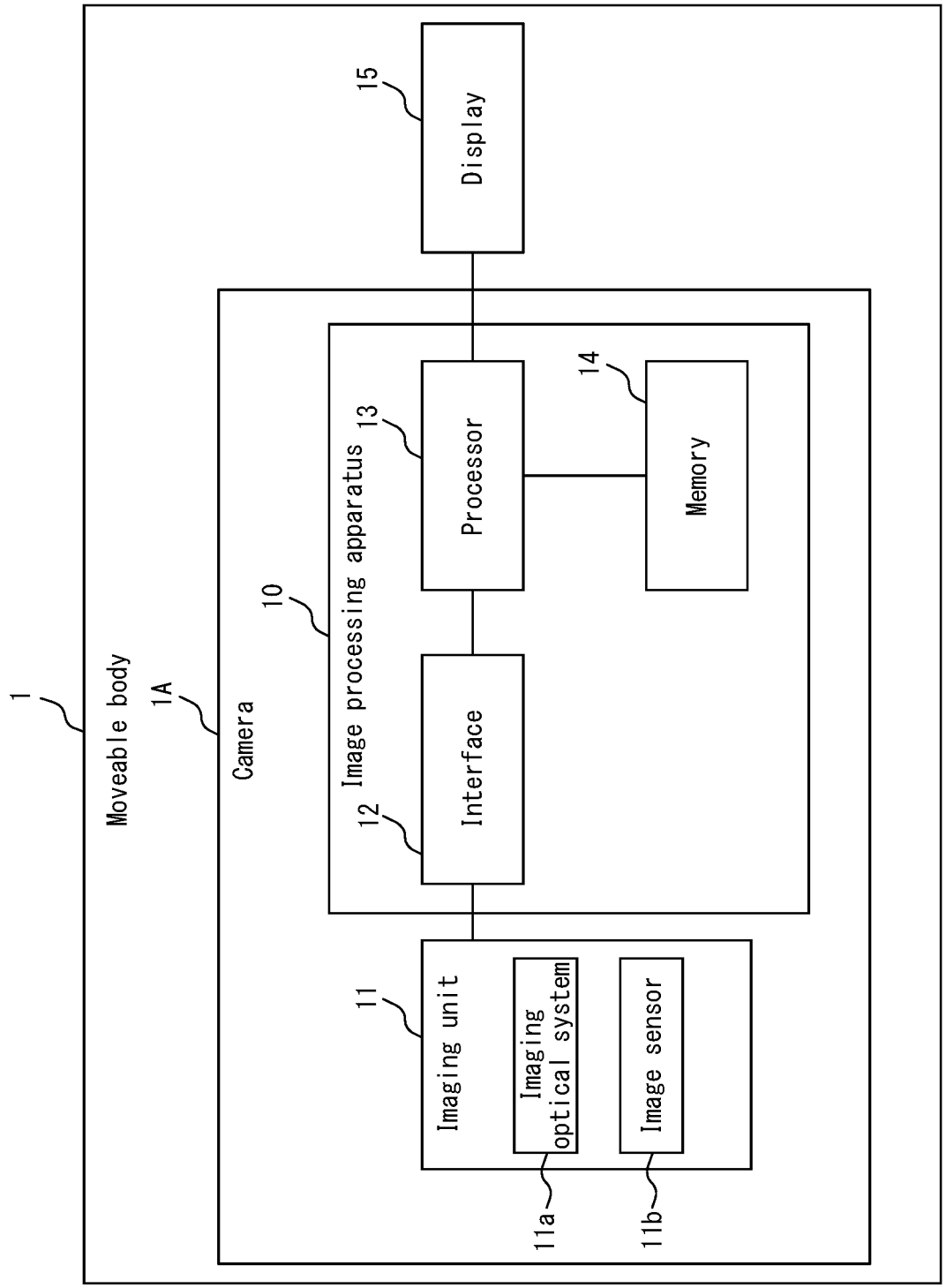
FIG. 1 is a diagram illustrating an example configuration of an image processing apparatus.

An image processing apparatus, a camera, a moveable body, an image processing method, and the like that enable a user to recognize whether there is a possibility of colliding in the height direction with an obstacle present in the travel direction of a moveable body are disclosed below.

Embodiments of the present disclosure are described below through examples with reference to the drawings. Identical reference signs in the drawings indicate identical or equivalent constituent elements.

FIG. 1 illustrates an example configuration of an image processing apparatus 10 according to an embodiment of the present disclosure. As illustrated in FIG. 1, the image processing apparatus 10 according to the present embodiment is mounted in a moveable body 1. The image processing apparatus 10 overlays a display indicating a course trajectory of a specific portion of the moveable body 1 in the travel direction of the moveable body 1 on a surrounding image yielded by capturing an image of the surrounding area of the moveable body 1.

The moveable body 1 is, for example, a vehicle. The vehicle may be an automobile or an industrial vehicle but is not limited to these. Other examples may include railway vehicles, vehicles for daily life, and fixed-wing aircraft that run on a runway. Examples of automobiles include, but are not limited to, passenger vehicles, trucks, buses, motorcycles, and trolley buses, and may include other vehicles that travel on the road. Industrial vehicles include industrial vehicles for agriculture and for construction. Industrial vehicles include, but are not limited to, forklifts and golf carts. Industrial vehicles for agriculture include, but are not limited to, tractors, cultivators, transplanters, binders, combines, and lawnmowers. Industrial vehicles for construction include, but are not limited to, bulldozers, scrapers, backhoes, cranes, dump cars, and road rollers. The vehicle may also be a human-powered vehicle. The vehicle is not limited to the above-listed types. For example, automobiles may include industrial vehicles that can drive on the road, and the same vehicle may be included in multiple categories.

Figure 10:
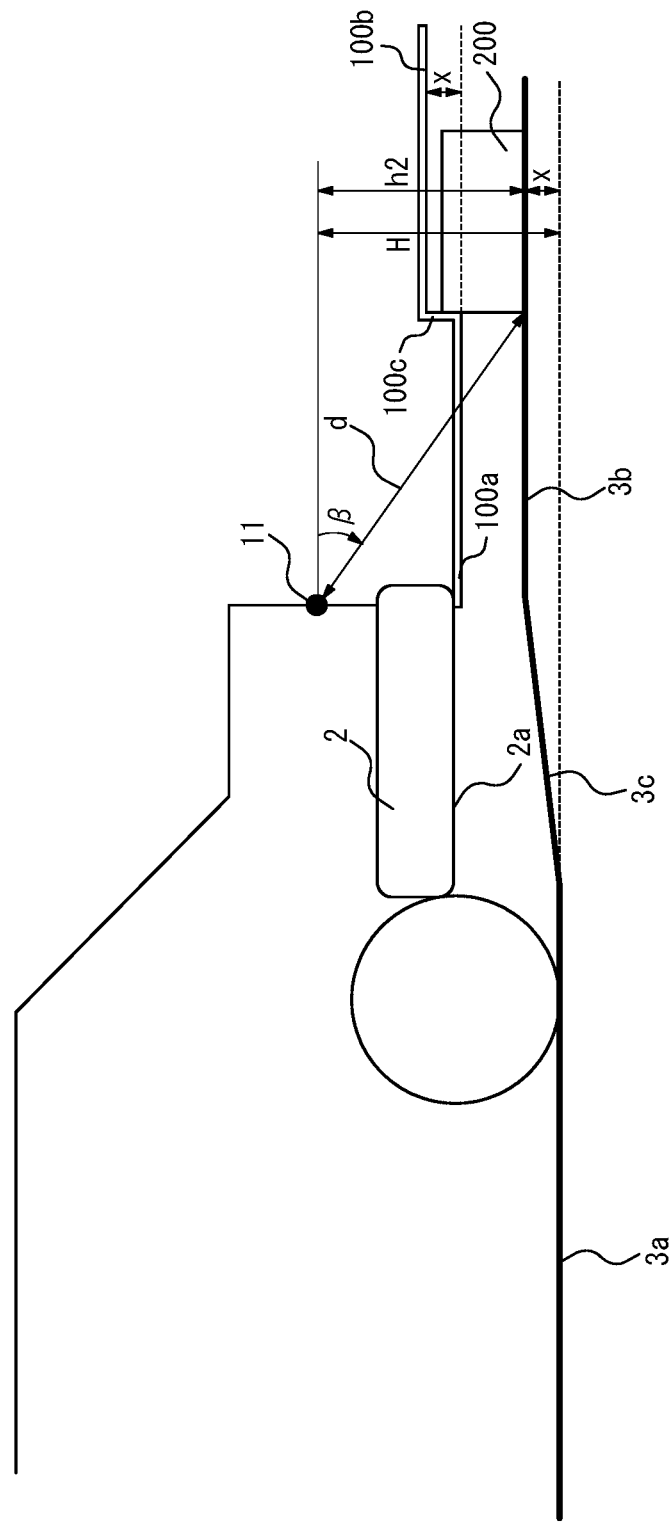
FIG. 10 is a diagram illustrating another example of correcting a display indicating a course trajectory when a road surface has a height difference.

The image processing apparatus 10 illustrated in FIG. 10 includes an interface 12, a processor 13, and a memory 14. An imaging unit 11 that acquires surrounding images of the moveable body 1 is mounted in the moveable body 1. The image processing apparatus 10 and the imaging unit 11 form a camera 1A mounted in the moveable body 1.

First, the imaging unit 11 is described.

The imaging unit 11 is an on-vehicle camera mounted in the moveable body 1. The imaging unit 11 acquires surrounding images yielded by capturing images of the surrounding area of the moveable body 1. A plurality of imaging units 11 may be mounted in the moveable body 1. For example, when four on-vehicle cameras are mounted in the moveable body 1, one imaging unit 11 may be arranged at each of a position capable of imaging the surrounding area in front of the moveable body 1 and at least a portion of the front surface of the moveable body 1, a position capable of imaging the surrounding area behind the moveable body 1 and at least a portion of the back surface of the moveable body 1, a position capable of imaging the surrounding area on the left side of the moveable body 1 and at least a portion of the left surface of the moveable body 1, and a position capable of imaging the surrounding area on the right side of the moveable body 1 and at least a portion of the right surface of the moveable body 1. With this arrangement, images are captured of the surrounding area in four directions from the moveable body 1.

The imaging unit 11 includes at least an imaging optical system 11a and an image sensor 11b.

For example, the imaging optical system 11a includes one or more lenses, apertures, and the like. The lens included in the imaging optical system 11a is a wide-angle lens such as a fisheye lens, for example. The imaging optical system 11a forms an image of a subject on an optical detection surface of the image sensor 11b. The image sensor 11b includes a charge coupled device (CCD) image sensor, a complementary metal-oxide semiconductor (CMOS) image sensor, or the like, for example. A plurality of pixels are arrayed on the optical detection surface of the image sensor 11b. The image sensor 11b generates a captured image by capturing the image of the subject formed on the optical detection surface. The imaging unit 11 may output the surrounding image to external apparatuses, such as an electronic control unit (ECU), a display, and/or a navigation apparatus mounted in the moveable body 1. The imaging unit 11 may include a function to perform predetermined image processing on the surrounding image, such as white balance adjustment, exposure adjustment, or gamma correction.

Next, the components of the image processing apparatus 10 are described.

The interface 12 communicates with the components of the moveable body 1 in a wired or wireless manner. For example, the interface 12 acquires a surrounding image captured by the imaging unit 11 and outputs the surrounding image to the processor 13.

Examples of the processor 13 include a dedicated processor such as a digital signal processor (DSP) and a general-purpose processor such as a central processing unit (CPU). The processor 13 controls overall operations of the image processing apparatus 10. For example, the processor 13 overlays a display indicating the course trajectory of a specific portion of the moveable body 1 in the travel direction of the moveable body 1 on the surrounding image acquired by the interface 12 at a position corresponding to the height of the specific portion from the road surface. Upon detecting an obstacle included in the surrounding image and present in the travel direction of the moveable body 1, the processor 13 changes the display indicating the course trajectory when the obstacle and the course trajectory of the specific portion of the moveable body 1 are in contact.

The processor 13 displays the surrounding image that has the display indicating the course trajectory of the specific portion of the moveable body 1 overlaid thereon on a display 15, for example, included in the moveable body 1. When the obstacle and the course trajectory of the specific portion of the moveable body 1 are in contact, the processor 13 may output a signal indicating danger of contact to an external destination. For example, when the obstacle and the course trajectory of the specific portion of the moveable body 1 are in contact, the processor 13 may cause a buzzer mounted in the moveable body 1 to output a warning sound. When the moveable body 1 includes a sonar configured to detect surrounding obstacles with sound waves, the processor 13 may be configured not to output the warning sound or the like even if the sonar detects a possibility of contact with an obstacle as long as the obstacle and the course trajectory of the specific portion of the moveable body 1 are not in contact.

The specific portion of the moveable body 1 is a portion restricted in the height direction with respect to movement of the moveable body 1. For example, the specific portion is the bottom surface or top surface of the vehicle body of the moveable body 1. Examples of the specific portion when the moveable body 1 is a vehicle include the bottom surface of the bumper of the vehicle, the roof of the vehicle, and an object installed on the roof of the vehicle.

The memory 14 includes a primary memory device, a secondary memory device, and the like, for example. The memory 14 stores various information and programs necessary for operation of the image processing apparatus 10.

The operations of the image processing apparatus 10 are now described.

Figure 2:
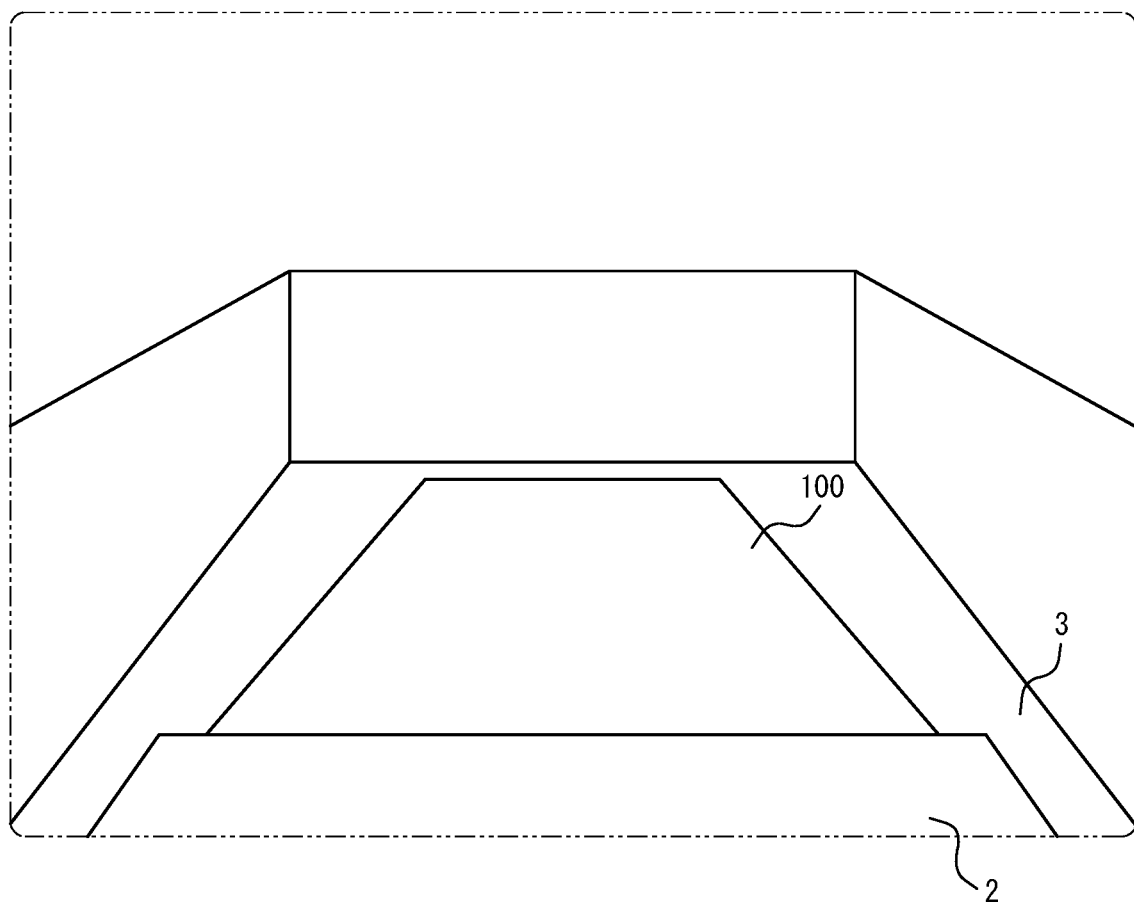
FIG. 2 is a diagram illustrating an example of overlaying a display indicating a course trajectory on a surrounding image.

FIG. 2 is a diagram illustrating an example of a display, indicating a course trajectory of a specific portion of the moveable body 1 in the travel direction of the moveable body 1, overlaid by the processor 13 on a surrounding image. An example is described below for the case of overlaying a display indicating a course trajectory of a specific portion of the moveable body 1 on a surrounding image of the area behind the moveable body 1 when the moveable body 1 is moving in reverse. The specific portion of the moveable body 1 in FIG. 2 is the bottom surface of the bumper 2.

As illustrated in FIG. 2, the processor 13 overlays a display 100 indicating the course trajectory of the bottom surface of the bumper 2 on the surrounding image. The processor 13 overlays the display 100 indicating the course trajectory of the bottom surface of the bumper 2 (the display indicating the course trajectory of the bottom surface of the vehicle body of the moveable body 1) on the surrounding image at a position corresponding to the height of the bottom surface of the bumper 2 from the road surface 3.

Figure 3:
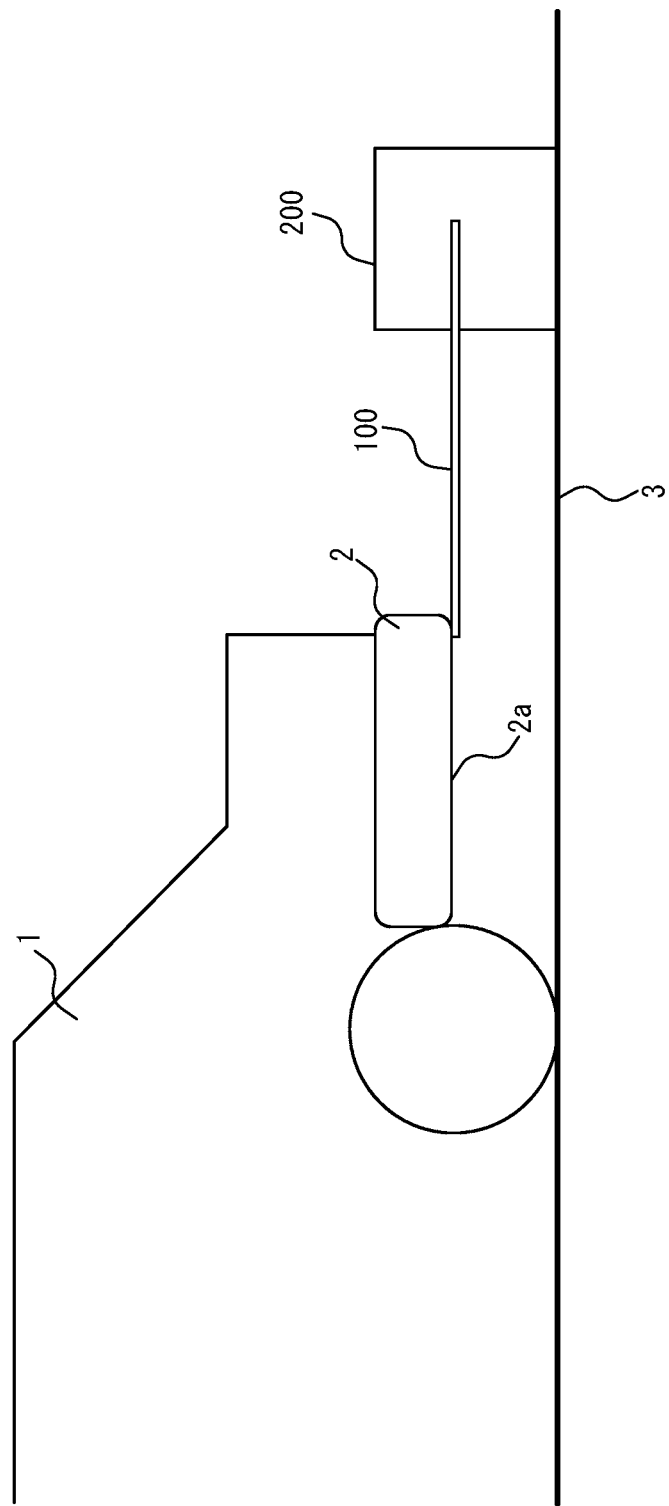
FIG. 3 is a diagram illustrating the overlay of a display indicating a course trajectory on a surrounding image.

FIG. 3 is a diagram illustrating the overlay of a display indicating a course trajectory on a surrounding image by the processor 13 when the moveable body 1 is viewed from the side. In the following explanation, the display indicating a course trajectory overlaid on a surrounding image is depicted virtually in the side views of the moveable body 1 viewed from the side.

As illustrated in FIG. 3, the processor 13 overlays the display 100 indicating the course trajectory of the bottom surface 2a of the bumper 2 on the surrounding image. The course trajectory is flat and extends from the bottom surface 2a of the bumper 2 in the travel direction of the moveable body 1. The processor 13 overlays the display indicating the course trajectory on the surrounding image as a flat surface of a predetermined color, for example. The processor 13 may overlay the flat surface on the surrounding image as a semitransparent or mesh-patterned flat surface.

The processor 13 detects whether an obstacle is present in the travel direction of the moveable body 1. The method for detecting whether an obstacle is present may, for example, be a method for detecting an obstacle by image analysis of the surrounding image captured in the travel direction of the moveable body 1. This example is not limiting, however, and any appropriate method may be used. It is assumed below that an obstacle 200, such as a parking block, is present on the road surface 3, as illustrated in FIG. 3.

Upon detecting the obstacle 200 present in the travel direction of the moveable body 1, the processor 13 judges whether the image of the obstacle 200 and the display 100 indicating the course trajectory are in contact in the surrounding image. The display 100 indicating the course trajectory is overlaid at a position corresponding to the height of the bottom surface 2a of the bumper 2 from the road surface 3. Accordingly, the processor 13 judges whether the image of the obstacle 200 and the display 100 indicating the course trajectory are in contact by whether the image of the obstacle 200 is higher than the display 100 indicating the course trajectory of the specific portion of the moveable body 1. In other words, the processor 13 judges whether the obstacle 200 and the specific portion of the moveable body 1 (bottom surface 2a of the bumper 2) are in contact.

Figure 4:
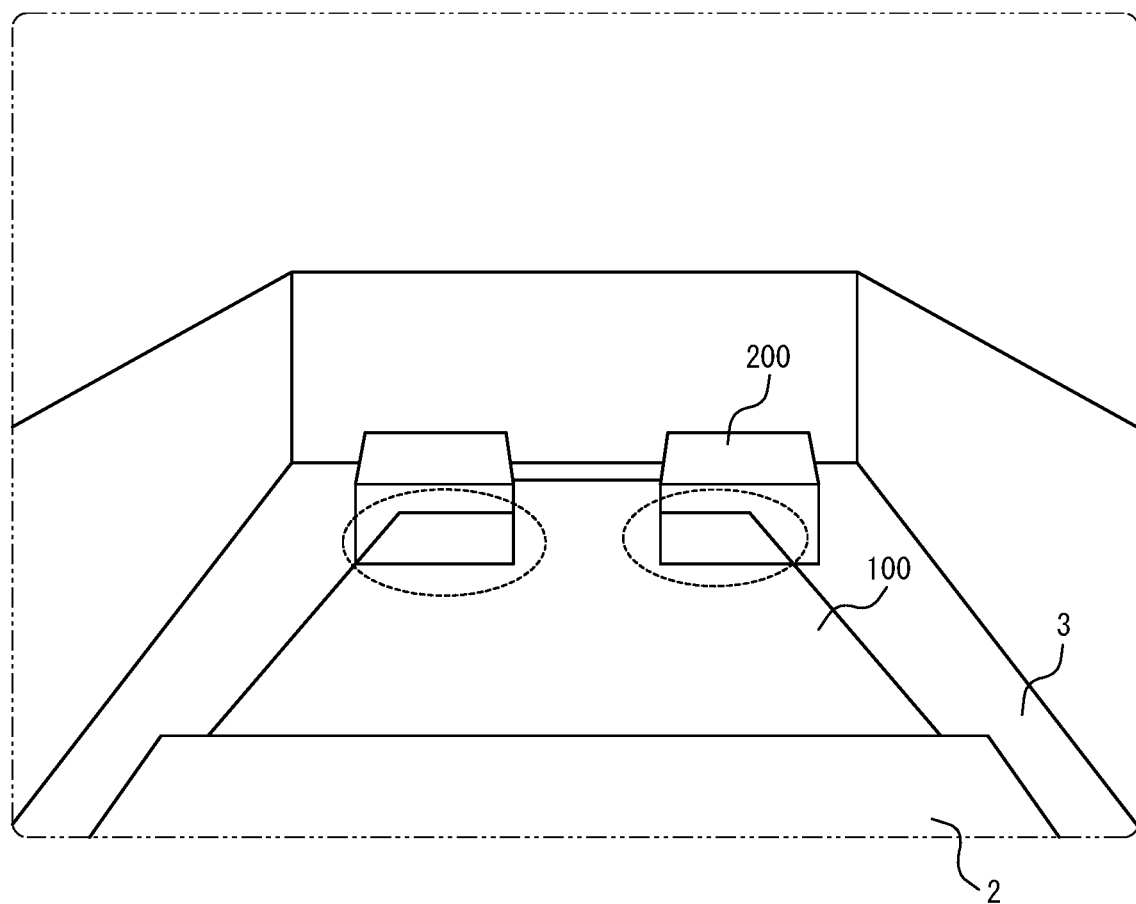
FIG. 4 is a diagram illustrating an example of overlaying a display indicating a course trajectory on a surrounding image when an obstacle is present on a road surface.

Upon judging that the obstacle 200 and the specific portion of the moveable body 1 are in contact, the processor 13 changes a portion of the display 100 indicating the course trajectory, as illustrated in FIG. 4. Specifically, the processor 13 changes the portion, within the display 100 indicating the course trajectory, that is in contact with the image of the obstacle 200 included in the surrounding image. In FIG. 4, the processor 13 changes the display 100 indicating the course trajectory of the portion in contact with the image of the obstacle 200 included in the surrounding image to appear as if embedded in the obstacle 200, as illustrated by the dashed ovals.

When the height of the obstacle 200 is less than the bottom surface 2a of the bumper 2 of the moveable body 1, the obstacle 200 and the bottom surface 2a of the bumper 2 of the moveable body 1 do not come in contact. If the predicted trajectory alone were overlaid on the surrounding image, the user would not be able to recognize the possibility of contact in the height direction between the obstacle 200 present on the road surface 3 and the moveable body 1. In the present disclosure, however, the processor 13 overlays the display 100 indicating the course trajectory of the specific portion of the moveable body 1 on the surrounding image at a position corresponding to the height of the specific portion. The processor 13 then changes the display 100 indicating the course trajectory when the obstacle 200 and the course trajectory of the specific portion are in contact. In this way, the user can easily recognize whether there is a possibility of contact in the height direction between the obstacle 200 present on the road surface 3 and the moveable body 1.

Figure 5:
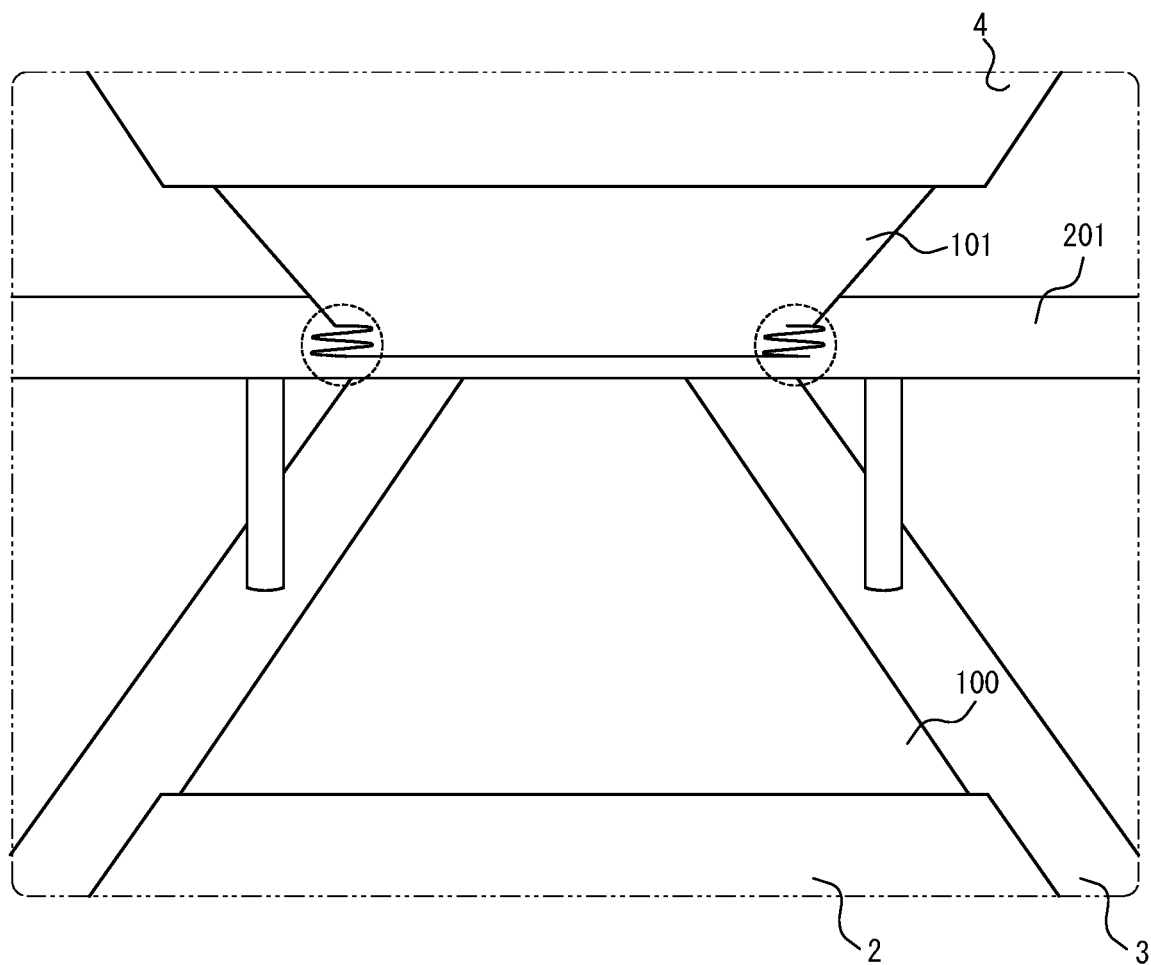
FIG. 5 is a diagram illustrating an example of overlaying a display indicating a course trajectory on a surrounding image when an obstacle is present above a road surface.

FIG. 5 is a diagram illustrating another example of a display, indicating a course trajectory of a specific portion of the moveable body 1, overlaid by the processor 13 on a surrounding image. In FIG. 5, the specific portion of the moveable body 1 is a rear spoiler 4 installed at the back of the roof of the vehicle. An obstacle 201 is present above the road surface 3 in FIG. 5.

As illustrated in FIG. 5, the processor 13 overlays a display 100 indicating the course trajectory of the bottom surface of the bumper 2 on the surrounding image. The processor 13 also overlays a display 101 indicating the course trajectory of the rear spoiler 4 (display indicating the course trajectory of the upper surface of the vehicle body of the moveable body 1) on the surrounding image at a position corresponding to the height of the upper surface of the rear spoiler 4 from the road surface 3.

Upon detecting the obstacle 201, the processor 13 judges whether the image of the obstacle 201 and the display 101 indicating the course trajectory are in contact in the surrounding image. The display 101 indicating the course trajectory is overlaid at a position corresponding to the height of the rear spoiler 4 from the road surface 3. Accordingly, the processor 13 judges whether the obstacle 201 and the display 101 indicating the course trajectory are in contact by whether the image of the obstacle 201 is higher than the display 101 indicating the course trajectory of the specific portion of the moveable body 1. In other words, the processor 13 judges whether the obstacle 201 and the specific portion of the moveable body 1 (rear spoiler 4) are in contact.

Upon judging that the obstacle 201 and the specific portion of the moveable body 1 are in contact, the processor 13 changes a portion of the display 101 indicating the course trajectory, as illustrated in FIG. 5. Specifically, the processor 13 changes the portion, within the display 101 indicating the course trajectory, that is in contact with the image of the obstacle 201 included in the surrounding image. In FIG. 5, the processor 13 changes the display 101 indicating the course trajectory so that the portion, within the display 101 indicating the course trajectory, that is in contact with the image of the obstacle 201 is crushed, as illustrated by the dashed circles.

When the height of the obstacle 201 is greater than the rear spoiler 4 of the moveable body 1, the obstacle 201 and the rear spoiler 4 do not come in contact. If the predicted trajectory were simply overlaid on the surrounding image, the user would not be able to recognize the possibility of contact in the height direction between the obstacle 201 present above the road surface 3 and the moveable body 1. In the present disclosure, however, the processor 13 overlays the display 101 indicating the course trajectory of the specific portion of the moveable body 1 on the surrounding image at a position corresponding to the height of the specific portion. The processor 13 then changes the display 101 indicating the course trajectory when the obstacle 201 and the course trajectory of the specific portion are in contact. In this way, the user can recognize whether there is a possibility of contact in the height direction between the obstacle 201 and the moveable body 1.

When the moveable body 1 and the obstacle are in contact, the processor 13 may overlay a display indicating danger of contact on the surrounding image and/or output a signal indicating danger of contact to an external destination. For example, the processor 13 may output a signal indicating danger of contact via the interface 12 to a buzzer mounted in the moveable body 1 and cause the buzzer to sound.

Figure 6:
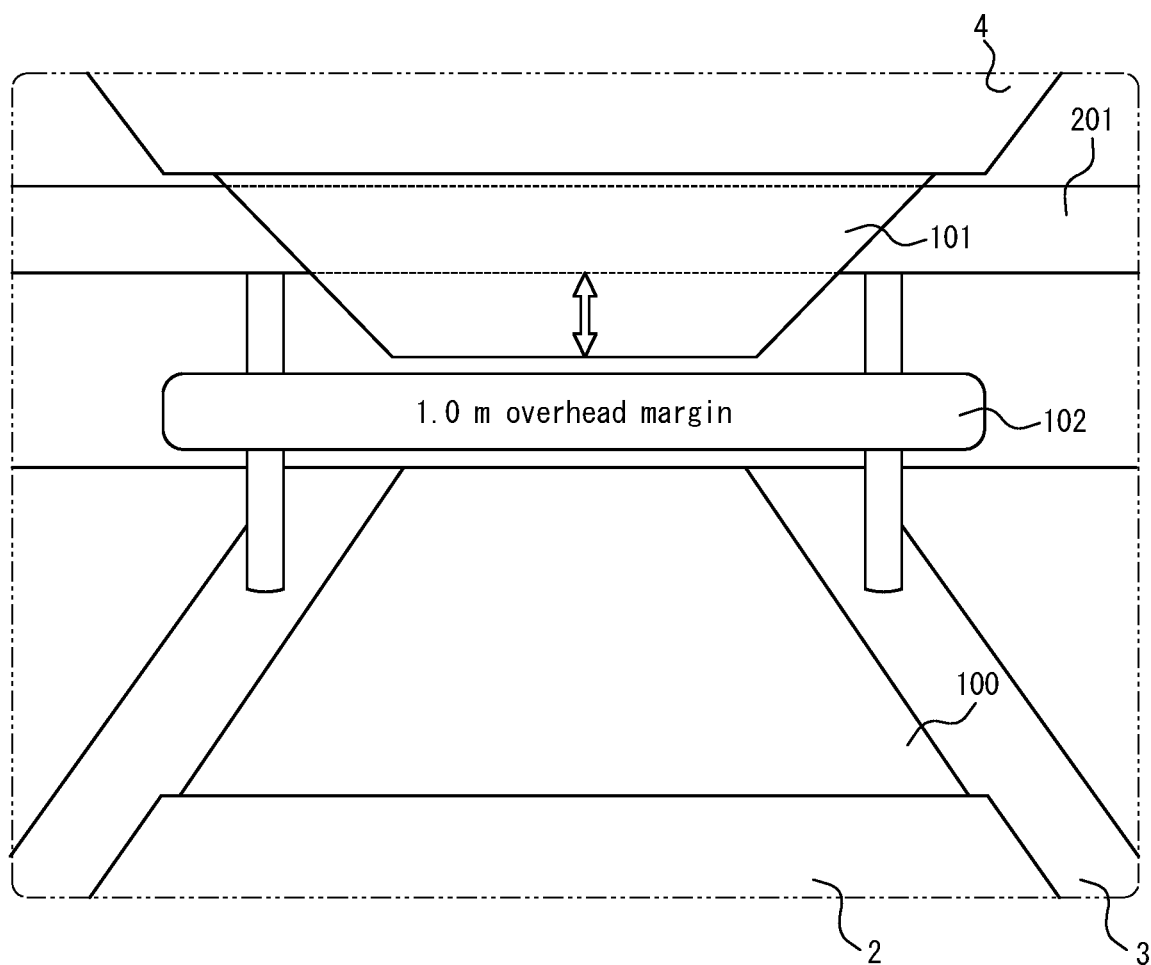
FIG. 6 is a diagram illustrating another example of overlaying a display indicating a course trajectory on a surrounding image when an obstacle is present above a road surface.

When the moveable body 1 and the obstacle are not in contact, the processor 13 may calculate the difference in height between the specific portion the moveable body 1 and the obstacle, and as illustrated in FIG. 6, may overlay a display 102 indicating the calculated difference on the surrounding image. FIG. 6 illustrates an example of the display 102, indicating the difference in height between the rear spoiler 4 and the obstacle 201, overlaid on the surrounding image.

Examples of the road surface 3 being flat have been described thus far, but the road surface 3 may have a height difference. The overlay of a display indicating the course trajectory on the surrounding image when the road surface 3 has a height difference is described below.

Figure 7:
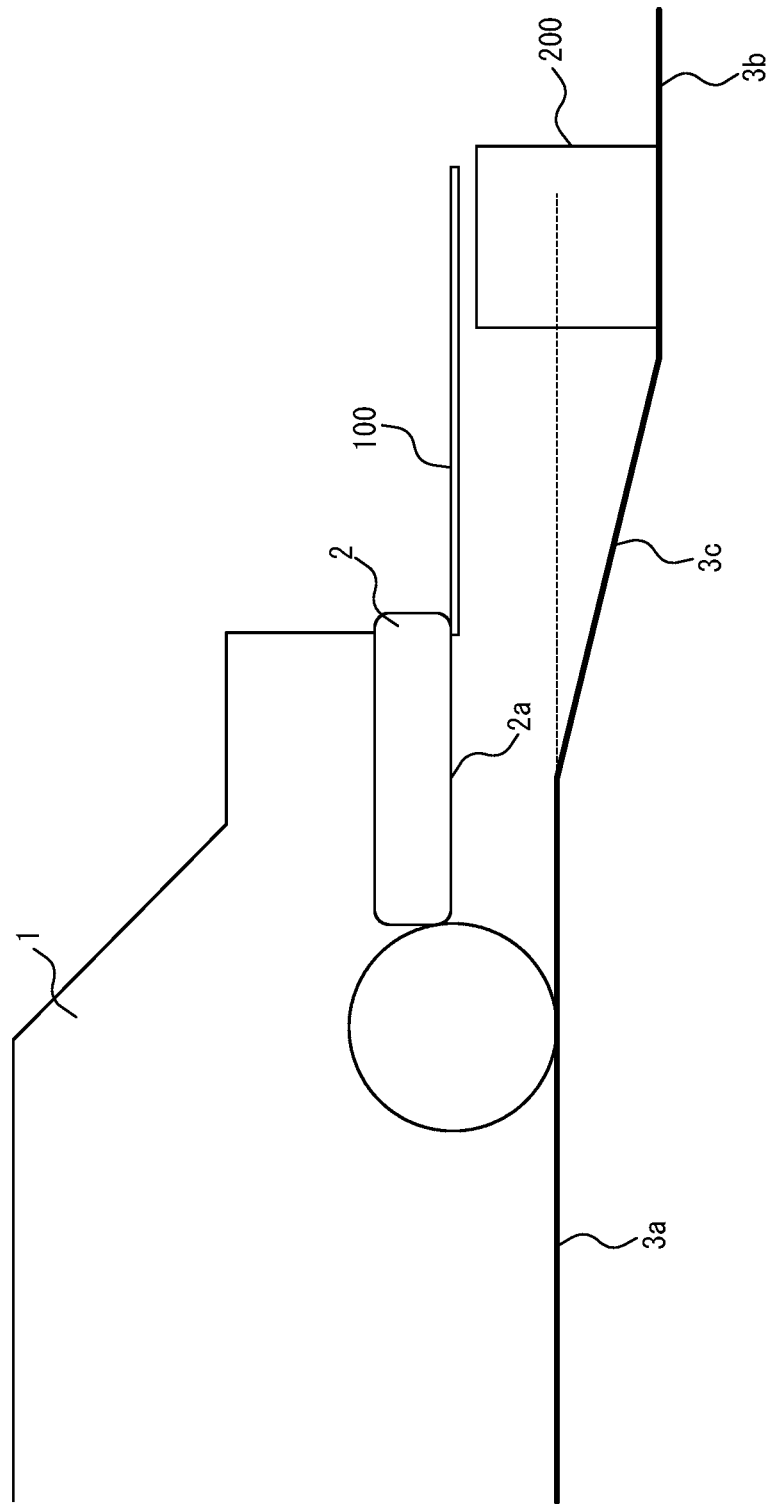
FIG. 7 is a diagram illustrating an example of overlaying a display indicating a course trajectory on a surrounding image when a road surface has a height difference.

FIG. 7 illustrates an example of the moveable body 1 seen from the side. In FIG. 7, the road surface 3 is, for example, formed by a horizontal road surface 3a, a horizontal road surface 3b at a lower position than the road surface 3a, and a downward-sloping road surface 3c that connects the road surface 3a and the road surface 3b. In FIG. 7, the moveable body 1 is moving from the road surface 3a towards the road surface 3b across the road surface 3c. An obstacle 200 is present on the road surface 3b. The height of the obstacle 200 is greater than the height of the bottom surface 2a of the bumper 2 from the road surface 3. In other words, the obstacle 200 and the bottom surface 2a of the bumper 2 are in contact at the road surface 3b. While the moveable body 1 is on the road surface 3a, the upper end of the obstacle 200 is at a lower position than the bottom surface 2a of the bumper 2.

When the moveable body 1 is on the road surface 3a, one method could be to overlay a display 100 indicating the course trajectory on the surrounding image as a flat shape extending in the travel direction of the moveable body 1 at a position corresponding to the height of the bottom surface 2a of the bumper 2 from the road surface 3a, as illustrated in FIG. 7. While the moveable body 1 is on the road surface 3a, the upper end of the obstacle 200 is at a lower position than the bottom surface 2a of the bumper 2, as described above. Therefore, while the moveable body 1 is on the road surface 3a, the display 100 indicating the course trajectory and the obstacle 200 are not in contact, as illustrated in FIG. 7. In other words, from the user's perspective, the moveable body 1 and the obstacle 200 appear not to come into contact. As described above, however, the obstacle 200 and the bottom surface 2a of the bumper 2 are in contact at the road surface 3b. Such a method therefore cannot properly enable the user to recognize the possibility of contact between the moveable body 1 and the obstacle 200.

The processor 13 corrects the display indicating the course trajectory in accordance with the height difference of the road surface 3. Specifically, the processor 13 corrects the vertical position of the display indicating the course trajectory in accordance with the height difference of the road surface 3. The correction of the display indicating the course trajectory is described below with reference to FIGS. 8 and 9.

Figure 8:
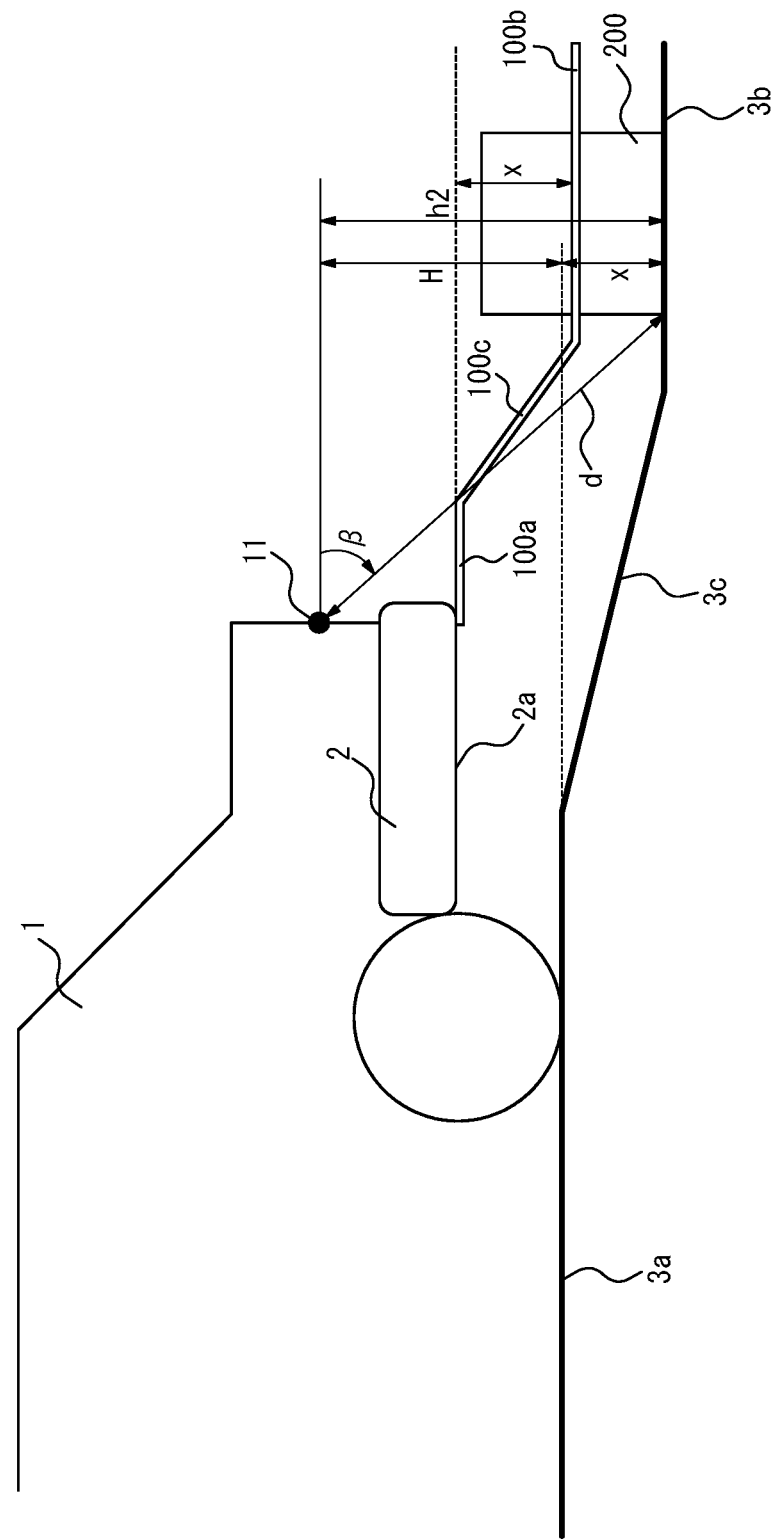
FIG. 8 is a diagram illustrating an example of correcting a display indicating a course trajectory when a road surface has a height difference.

As illustrated in FIG. 8, the height from the road surface 3 of the imaging unit 11 provided in the moveable body 1 is designated H. The height H of the imaging unit 11 from the road surface 3 is a unique, known value. The height of the imaging unit 11 from the road surface 3b is designated h2. The correction value in the height direction of the display indicating the course trajectory is designated x. The correction value x corresponds to the height of the road surface 3c. The distance from the imaging unit 11 to the obstacle 200 is designated d. The distance d is the distance between the imaging unit 11 and the contact point between the obstacle 200 and the road surface 3b as viewed from the imaging unit 11. The angle between the horizontal direction and the direction from the imaging unit 11 to the obstacle 200 is designated β.

Upon detecting the obstacle 200, the processor 13 calculates the distance d and the angle β. Details of the method for calculating the distance d and the angle β are provided below. The processor 13 calculates the height h2 of the imaging unit 11 from the road surface 3b in accordance with Expression (1) below based on the calculated distance d and angle β.

$$h2 = d \times \sin\beta \quad \text{Expression (1)}$$

Upon calculating the height h2 of the imaging unit 11 from the road surface 3b, the processor 13 calculates the correction value x in accordance with Expression (2) below.

$$x = h2 - H \quad \text{Expression (2)}$$

Figure 9:
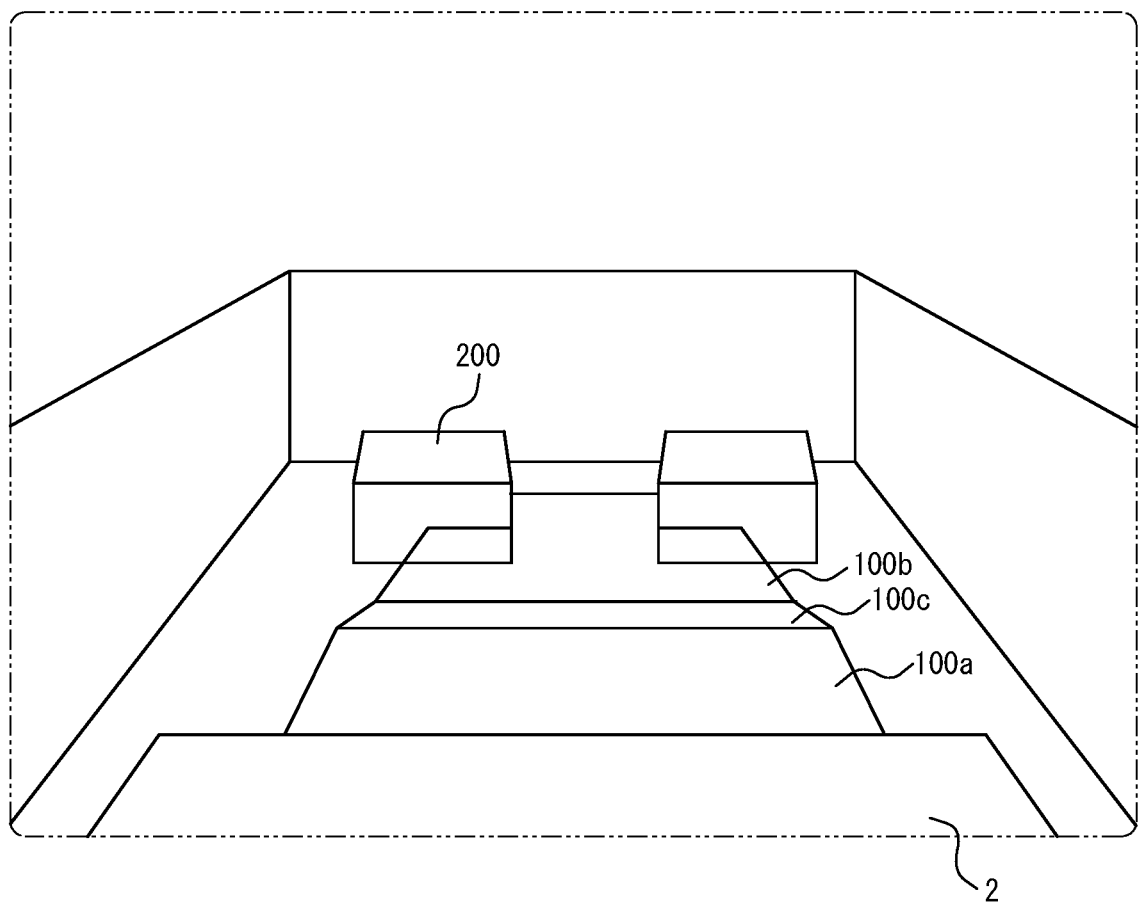
FIG. 9 is a diagram illustrating another example of overlaying a display indicating a course trajectory on a surrounding image when a road surface has a height difference.

The processor 13 corrects the display 100 indicating the course trajectory of the bottom surface 2a of the bumper 2 based on the calculated correction value x. Specifically, the processor 13 overlays a display 100a indicating the course trajectory on the surrounding image as a flat shape extending in the travel direction of the moveable body 1 at a position corresponding to the height of the bottom surface 2a of the bumper 2 from the road surface 3a, as illustrated in FIGS. 8 and 9. The processor 13 also overlays a display 100b indicating the course trajectory on the surrounding image as a flat shape extending towards the obstacle 200 from ahead of the obstacle 200 at a position lower, by the correction value x, than the display 100a indicating the course trajectory. The processor 13 also overlays a display 100c indicating the course trajectory that connects the display 100a indicating the course trajectory and the display 100b indicating the course trajectory.

When the display 100b indicating the course trajectory and the obstacle 200 are in contact as illustrated in FIG. 8, the processor 13 changes the display 100b indicating the course trajectory at the portion where the display 100b indicating the course trajectory and the obstacle 200 are in contact, as illustrated in FIG. 9. In this way, the user can properly recognize whether there is a possibility of contact in the height direction between the obstacle 200 and the moveable body 1 even when the road surface 3 has a height difference.

In FIGS. 7 to 9, an example of the road surface 3 sloping downward in the travel direction of the moveable body 1 has been described, but the processor 13 also calculates the correction value x by a similar method when the road surface 3 slopes upward in the travel direction of the moveable body 1, as illustrated in FIG. 10.

In FIG. 10, the road surface 3 is, for example, formed by a horizontal road surface 3a, a horizontal road surface 3b at a higher position than the road surface 3a, and an upward-sloping road surface 3c that connects the road surface 3a and the road surface 3b.

As illustrated in FIG. 10, the processor 13 also calculates the correction value x by the above-described Expressions (1), (2) when the road surface 3 slopes upward. The processor 13 then corrects the display 100 indicating the course trajectory based on the calculated correction value x. Specifically, the processor 13 overlays a display 100a indicating the course trajectory on the surrounding image as a flat shape extending in the travel direction of the moveable body 1 at a position corresponding to the height of the bottom surface 2a of the bumper 2 from the road surface 3a. The processor 13 also overlays a display 100b indicating the course trajectory on the surrounding image as a flat shape extending towards the obstacle 200 from ahead of the obstacle 200 at a position higher, by the correction value x, than the display 100a indicating the course trajectory. The processor 13 also overlays a display 100c indicating the course trajectory that connects the display 100a indicating the course trajectory and the display 100b indicating the course trajectory. In this way, the processor 13 enables the user to properly recognize whether there is a possibility of contact in the height direction between the obstacle 200 and the moveable body 1 even when the road surface 3 slopes upward.

Details of the method for calculating the above-described distance d and angle β are now provided.

The processor 13 detects the distance d and the angle β using a stereo camera, a Light Detection and Ranging (Lidar) apparatus, an infrared sensor, or the like. A Lidar apparatus is an apparatus for emitting pulsed laser light and measuring scattered light from the laser light to detect the distance and the like to an object. The processor 13 may use the calculation method described with reference to FIG. 11 to calculate the distance d and the angle β.

Figure 11:
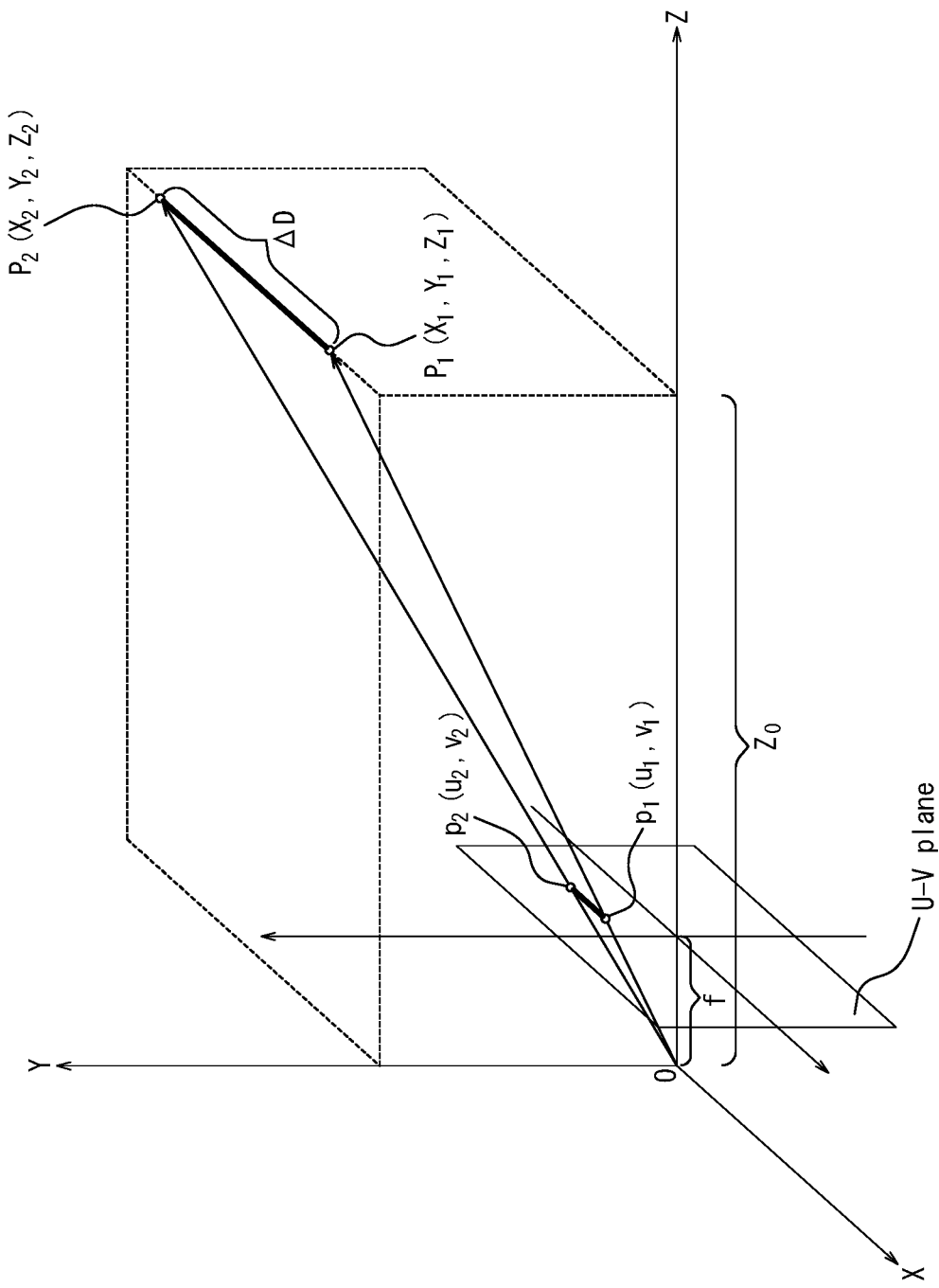
FIG. 11 is a diagram illustrating the calculation of the distance to an obstacle and the direction of the obstacle.

As illustrated in FIG. 11, a three-dimensional coordinate system (XYZ coordinate system) with the origin O at the optical center of the lens included in the imaging unit 11 is considered. In FIG. 11, the optical axis of the imaging unit 11 is assumed to match the z-axis. The focal length, in the z-axis direction, of the lens provided in the imaging unit 11 is designated f. It is assumed that, along with movement of the moveable body 1, a feature point of the obstacle moves from the perspective of the imaging unit 11 in a plane, which is a distance $Z_0$ from the origin O along the z-axis, from position $P_1(X_1, Y_1, Z_1)$ to position $P_2(X_2, Y_2, Z_2)$ by a movement amount $\Delta D$ in a direction rotated by angle θ relative to the straight direction. The angle θ and the movement amount $\Delta D$ are known from the movement amount of the moveable body 1. In this case, the feature point of the obstacle moves in the z-axis direction from position $p_1(u_1, v_1)$ to position $p_2(u_2, v_2)$ in the U-V plane, which is at a distance equal to the focal length f from the origin O.

In the coordinate system illustrated in FIG. 11, the processor 13 calculates $Z_0$ in accordance with Expression (3) below.

$$f:Z_0 = |u_2 - u_1|:\Delta D \qquad \text{Expression (3)}$$

Next, the processor 13 calculates the coordinates of position $P_2(X_2, Y_2, Z_2)$ in accordance with Expressions (4) to (6) below.

$$X_2 = \frac{u_2(u_1 \cos\theta - f\sin\theta)}{f(u_2 - u_1)} \cdot \Delta D \qquad \text{Expression (4)}$$

$$Y_2 = \frac{v_1 v_2 \cos\theta}{f(v_2 - v_1)} \cdot \Delta D \qquad \text{Expression (5)}$$

$$Z_2 = \frac{u_1 \cos\theta - f\sin\theta}{u_2 - u_1} \cdot \Delta D \qquad \text{Expression (6)}$$

The processor 13 then calculates the distance d and the angle β based on the calculated coordinates of position $P_2(X_2, Y_2, Z_2)$.

In FIGS. 8 to 10, the correction of the display 100 indicating the course trajectory of the bottom surface (bottom surface 2a of the bumper 2) of the vehicle body of the moveable body 1 when the road surface 3 has a height difference has been described. When the road surface 3 has a height difference, the processor 13 may also correct the display 101 indicating the course trajectory of the upper surface of the vehicle body of the moveable body 1 based on the correction value x. The correction of the display 101 indicating the course trajectory of the upper surface of the vehicle body of the moveable body 1 is described below with reference to FIG. 12.

Figure 12:
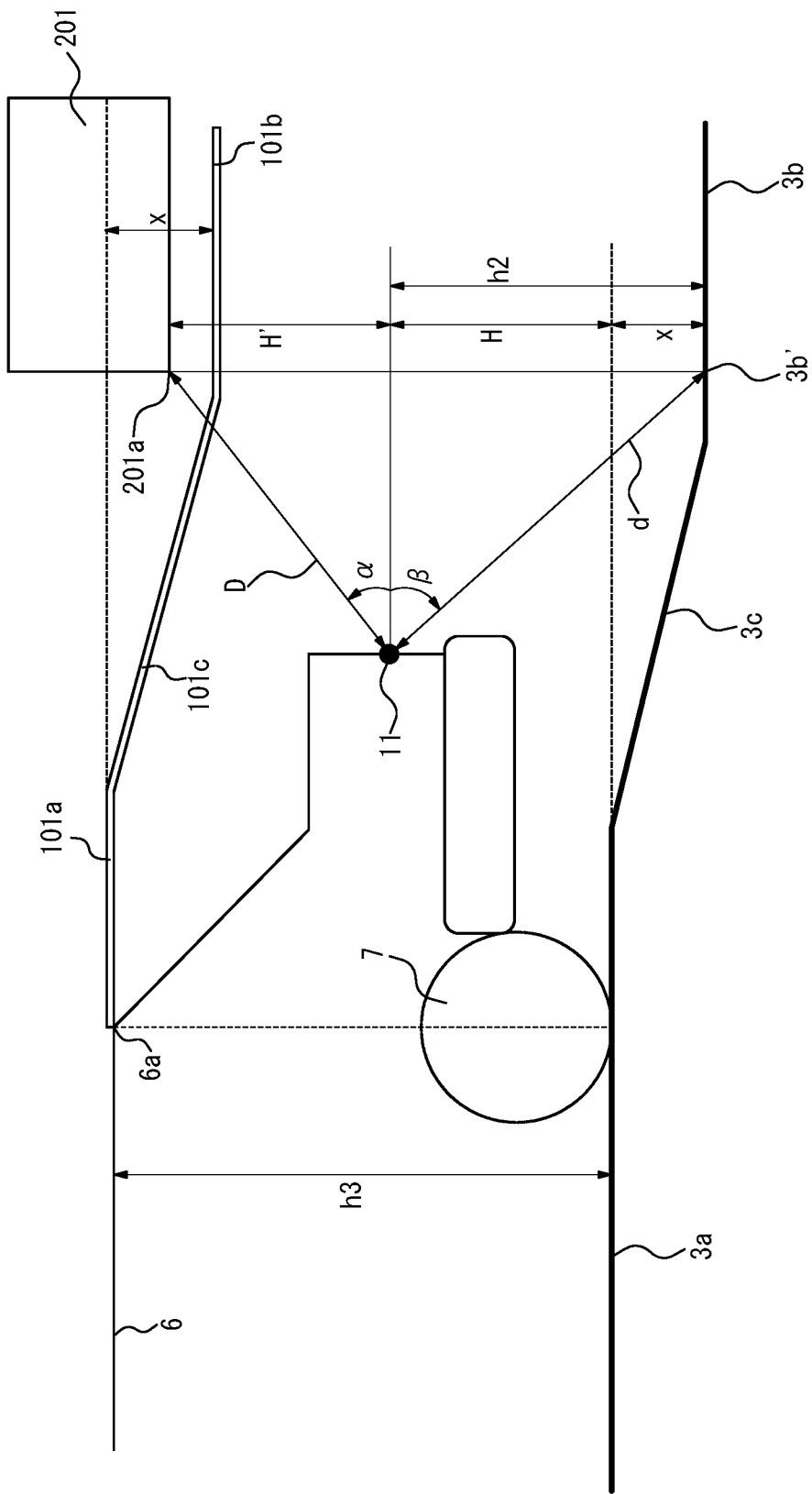
FIG. 12 is a diagram illustrating another example of correcting a display indicating a course trajectory when a road surface has a height difference.

In FIG. 12, the road surface 3 is formed by a horizontal road surface 3a, a horizontal road surface 3b at a lower position than the road surface 3a, and a downward-sloping road surface 3c that connects the road surface 3a and the road surface 3b. An obstacle 201 is present above the road surface 3b. While the moveable body 1 is on the road surface 3a, a roof 6 of the moveable body 1 is assumed to be higher than the bottom surface of the obstacle 201. In other words, when the obstacle 201 is viewed from the moveable body 1 while the moveable body 1 is on the road surface 3a, the roof 6 of the moveable body 1 appears to be in contact with the obstacle 201.

The processor 13 calculates the correction value x using a similar method as the method described with reference to FIG. 8. In FIG. 12, however, the processor 13 calculates the distance between the imaging unit 11 and a point 3b' on the road surface 3b directly below the edge 201a of the obstacle 201 closest to the moveable body 1 as the distance d. The processor 13 calculates the angle between the horizontal direction and the direction from the imaging unit 11 towards the point 3b' as the angle β. The point 3b' on the road surface 3b directly below the edge 201a of the obstacle 201 is, for example, calculated based on the surrounding image captured by the imaging unit 11.

Next, the processor 13 corrects the display 101 indicating the course trajectory of the upper surface (roof 6) of the vehicle body of the moveable body 1. Specifically, the processor 13 overlays a display 101a indicating the course trajectory on the surrounding image as a flat shape extending in the travel direction of the moveable body 1 at a position corresponding to the height of a rear edge 6a of the roof 6 from the road surface 3a. The processor 13 also overlays a display 101b indicating the course trajectory on the surrounding image as a flat shape extending towards the obstacle 201 from ahead of the obstacle 201 at a position lower, by the correction value x, than the display 101a indicating the course trajectory. The processor 13 also overlays a display 101c indicating the course trajectory that connects the display 101a indicating the course trajectory and the display 101b indicating the course trajectory. In this way, the display indicating the course trajectory of the upper surface of the vehicle body of the moveable body 1 is also corrected in accordance with the height difference of the road surface 3.

An example of the obstacle 201 and the display 101b indicating the course trajectory not coming in contact has been illustrated in FIG. 12, but the processor 13 may change a portion of the display 101b indicating the course trajectory when the obstacle 201 and the display 101b indicating the course trajectory are in contact.

The judgment of whether the obstacle 201 and the display 101b indicating the course trajectory are in contact may be made as follows, for example. As illustrated in FIG. 12, the height from the imaging unit 11 to the obstacle 201 is designated H', the distance from the imaging unit 11 to the edge 201a of the obstacle 201 is designated D, and the angle between the horizontal direction and the direction from the imaging unit 11 towards the edge 201a of the obstacle 201 is designated α. The height of the roof 6 of the moveable body 1 from the road surface 3 is designated h3.

The processor 13 calculates the distance D and the angle α. The distance D and the angle α are calculated by the method described with reference to FIG. 10. The processor 13 calculates the height H' from the imaging unit 11 to the obstacle 201 in accordance with Expression (7) below.

$$H' = D \times \sin\alpha \qquad \text{Expression (7)}$$

As illustrated in FIG. 12, the height of the bottom surface of the obstacle 201 is represented as H+H'. By comparing the height (H+H') of the obstacle 201 and the height h3 of the roof 6, the processor 13 judges whether the obstacle 201 and the display 101b indicating the course trajectory are in contact.

Figure 13:
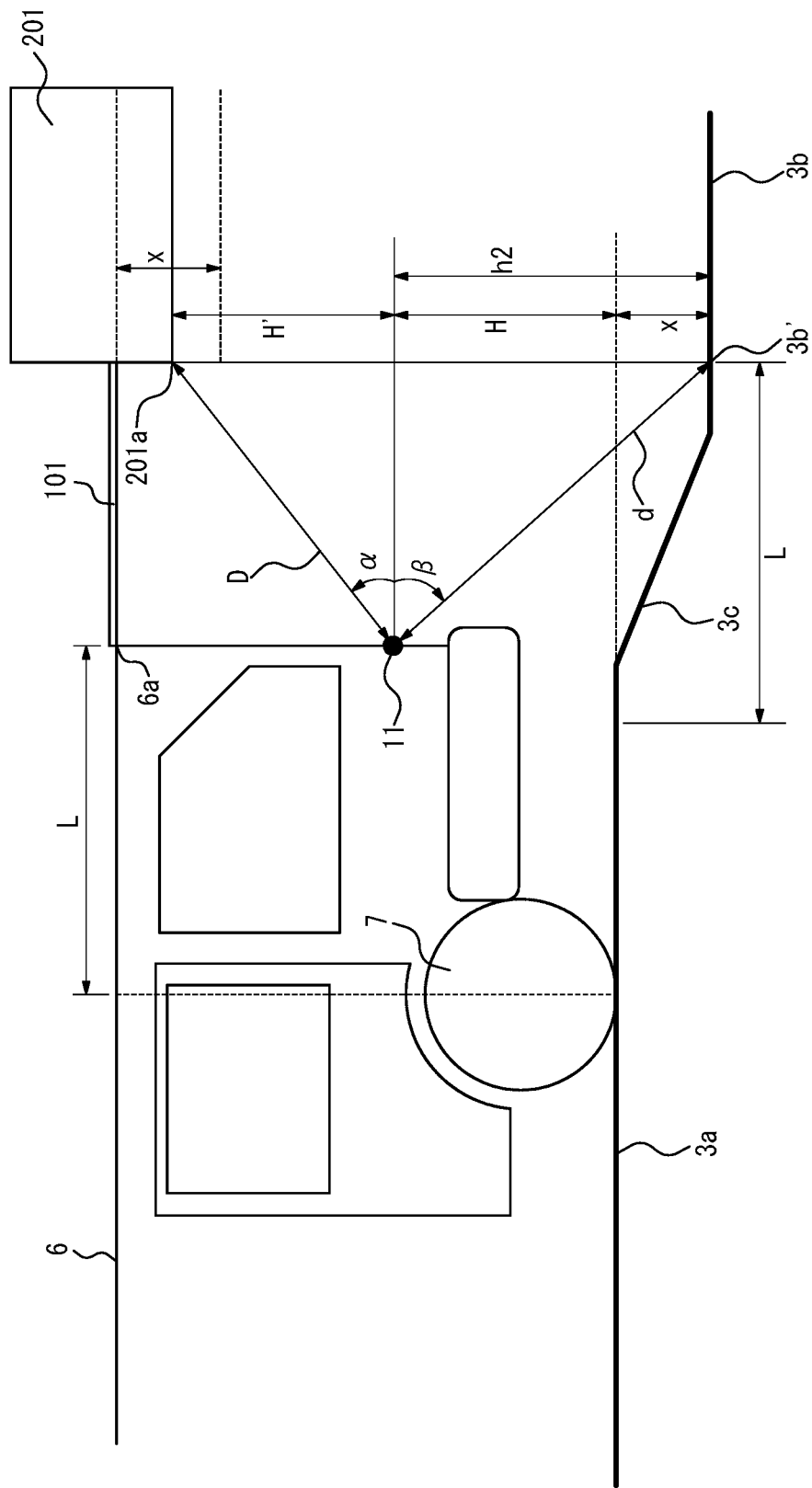
FIG. 13 is a diagram illustrating another example of correcting a display indicating a course trajectory when a road surface has a height difference.

FIG. 12 illustrates an example of the edge 6a of the roof 6 of the moveable body 1 being directly above or near the contact point between the road surface 3 and a tire 7. In some moveable bodies 1, however, the edge 6a of the roof 6 of the moveable body 1 may be provided farther back than the contact point between the road surface 3 and the tire 7. With reference to FIG. 13, the overlay of a display 101 indicating the course trajectory on a surrounding image is described for a moveable body 1 in which the edge 6a of the roof 6 is provided farther back than the contact point between the road surface 3 and the tire 7. In FIG. 13, the roof 6 of the moveable body 1 is higher than the bottom surface of the obstacle 201 while the moveable body 1 is on the road surface 3a, as in FIG. 12. In other words, when the obstacle 201 is viewed from the moveable body 1 while the moveable body 1 is on the road surface 3a, the roof 6 of the moveable body 1 appears to be in contact with the obstacle 201.

In FIG. 13, the edge 6a of the roof 6 of the moveable body 1 is provided farther back by a distance of L from the contact point between the tire 7 and the road surface 3. The distance L is a unique, known value.

First, the processor 13 calculates the correction value x. Next, the processor 13 judges whether the height of the point that is the distance L, towards the moveable body 1, from the point 3b' on the road surface 3b directly below the edge 201a of the obstacle 201 and the height of the contact point of the tire 7 are the same.

While the moveable body 1 is on the road surface 3a, the roof 6 of the moveable body 1 is higher than the bottom surface of the obstacle 201 in FIG. 13, as described above. Therefore, when a point that is the distance L towards the moveable body 1 from the point 3b' on the road surface 3b lies on the road surface 3a, the edge 6a of the roof 6 of the moveable body 1 and the obstacle 201 come into contact upon the moveable body 1 moving to the point. In this case, the processor 13 overlays the display 101 indicating the course trajectory extending from the edge 6a of the roof 6 to the obstacle 201 on the surrounding image at a position corresponding to the height of the roof 6 from the road surface 3, without correcting the display 101 indicating the course trajectory using the correction value x. In this way, the user can recognize that there is a possibility of contact with the obstacle 201.

Figure 14:
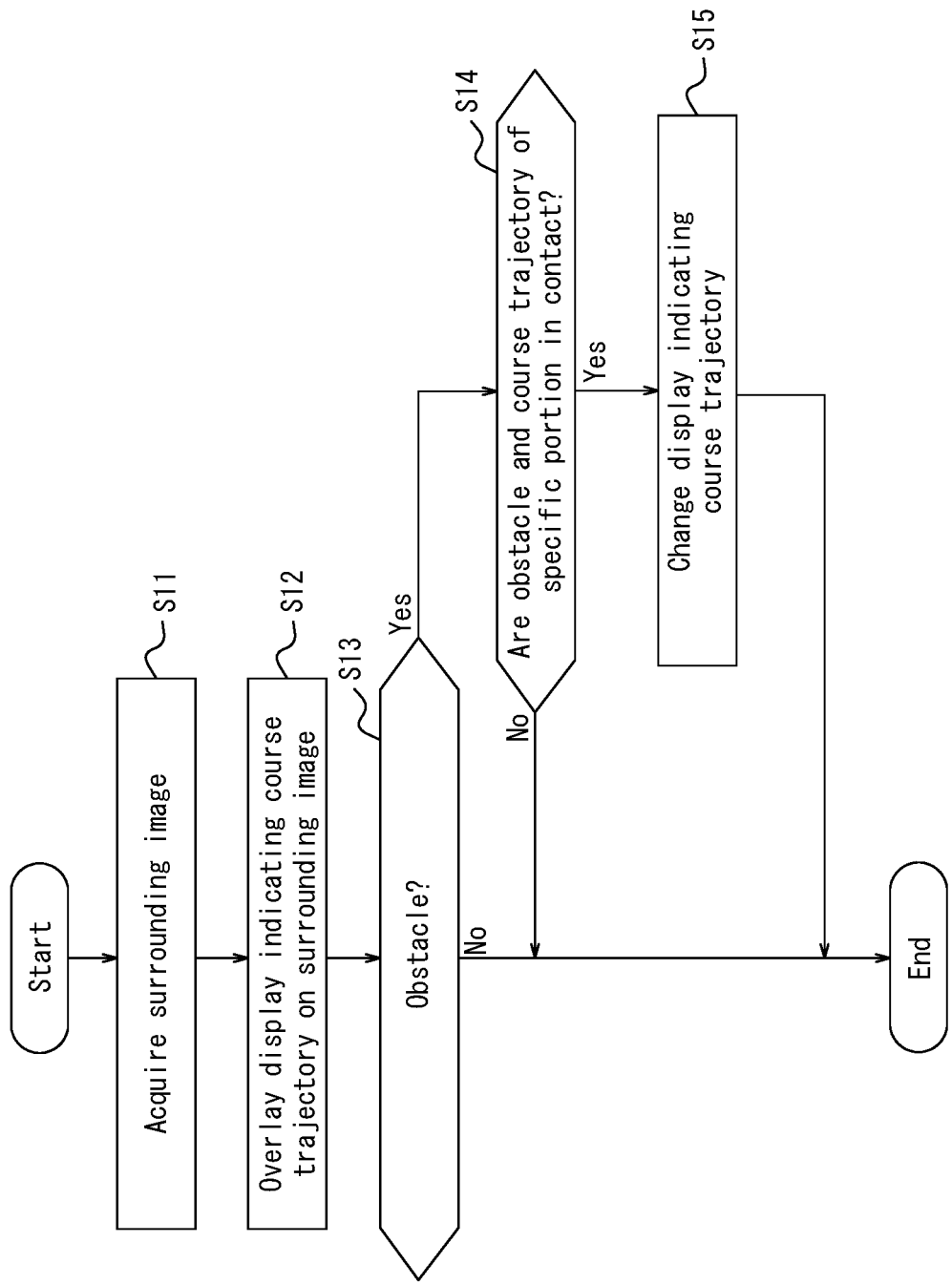
FIG. 14 is a flowchart illustrating an image processing method for an image processing apparatus.

Next, an image processing method used in the image processing apparatus 10 according to the present embodiment is described with reference to the flowchart in FIG. 14. The image processing apparatus 10 repeats the flow illustrated in FIG. 14 at predetermined time intervals, for example.

The interface 12 acquires a surrounding image captured by the imaging unit 11 (step S11).

The processor 13 overlays a display indicating the course trajectory of a specific portion of the moveable body 1 in the travel direction of the moveable body 1 on the acquired surrounding image at a position corresponding to the height of the specific portion from the road surface 3 (step S12).

Next, the processor 13 judges whether an obstacle is present in the travel direction of the moveable body 1 (step S13).

When it is judged that an obstacle is not present in the travel direction of the moveable body 1 (step S13: No), the processor 13 ends the processing without changing the display indicating the course trajectory overlaid on the surrounding image.

When it is judged that an obstacle is present in the travel direction of the moveable body 1 (step S13: Yes), the processor 13 judges whether the obstacle and the course trajectory of the specific portion of the moveable body 1 are in contact (step S14).

When it is judged that the obstacle and the course trajectory are not in contact (step S14: No), the processor 13 ends the processing without changing the display indicating the course trajectory overlaid on the surrounding image.

When it is judged that the obstacle and the course trajectory are in contact (step S14: Yes), the processor 13 changes the display indicating the course trajectory. Here, the processor 13 changes the portion, within the display indicating the course trajectory, where the image of the obstacle included in the surrounding image is in contact with the display of the course trajectory of the specific portion.

In the present embodiment, the image processing apparatus 10 thus includes the interface 12 configured to acquire a surrounding image of the moveable body 1 and the processor 13 configured to overlay a display indicating a course trajectory of a specific portion of the moveable body 1 in a travel direction of the moveable body 1 on the surrounding image at a position corresponding to the height of the specific portion from a road surface. The processor 13 is configured to change the display indicating the course trajectory when an obstacle, included in the surrounding image and present in the travel direction of the moveable body 1, and the course trajectory of the specific portion are in contact.

When the display indicating the course trajectory of the specific portion of the moveable body 1 is overlaid on the surrounding image at a position corresponding to the height of the specific portion from a road surface, and the obstacle and the course trajectory are in contact, then the display indicating the course trajectory is changed. This enables the user to more easily recognize the possibility of a collision in the height direction between the moveable body 1 and the obstacle.

Although embodiments of the present disclosure have been explained using the accompanying drawings and examples, it is to be noted that various changes and modifications can be made by those of ordinary skill in the art based on the present disclosure. Therefore, such changes and modifications are to be understood as included within the scope of the present disclosure.

The invention claimed is:

1. An image processing apparatus comprising:
an interface configured to acquire a surrounding image of a moveable body; and
a processor configured to overlay a display indicating a course trajectory of a specific portion of the moveable body in a travel direction of the moveable body on the surrounding image at a position corresponding to a height of the specific portion from a road surface, wherein
the processor is configured to change the display indicating the course trajectory when an obstacle, included in the surrounding image and present in the travel direction of the moveable body, and the course trajectory of the specific portion are in contact, and is configured to correct the display indicating the course trajectory based on a correction value that is calculated based on a change in a height of the road surface.

2. The image processing apparatus of claim 1, wherein the processor is configured to change a portion within the display indicating the course trajectory, where an image of the obstacle and the display of the course trajectory of the specific portion are in contact.

3. The image processing apparatus of claim 1, wherein the specific portion is a portion restricted in a height direction with respect to movement of the moveable body.

4. The image processing apparatus of claim 3, wherein
the moveable body is a vehicle, and
the specific portion is a bottom surface of a bumper of the vehicle, a roof of the vehicle, or an object installed on the roof of the vehicle.

5. The image processing apparatus of claim 1, wherein when the obstacle and the course trajectory are in contact, the processor is configured to overlay a display indicating danger of contact on the surrounding image or output a signal indicating danger of contact to an external destination.

6. The image processing apparatus of claim 1, wherein
the processor is configured to correct the display indicating the course trajectory based on the correction value that is calculated based on the change in the height of the road surface with reference to a portion of the movable body.

7. A camera comprising:
an imaging optical system;
an image sensor configured to capture an image formed via the imaging optical system;
an interface configured to acquire a surrounding image, captured by the image sensor, of a moveable body; and
a processor configured to overlay a display indicating a course trajectory of a specific portion of the moveable body in a travel direction of the moveable body on the surrounding image at a position corresponding to a height of the specific portion from a road surface, wherein
the processor is configured to change the display indicating the course trajectory when an obstacle, included in the surrounding image and present in the travel direction of the moveable body, and the course trajectory of the specific portion are in contact, and is configured to correct the display indicating the course trajectory based on a correction value that is calculated based on a change in a height of the road surface.

8. A moveable body comprising the camera according to claim 7 wherein the camera images a surrounding area of the moveable body.

9. The camera of claim 7, wherein
the processor is configured to correct the display indicating the course trajectory based on the correction value that is calculated based on the change in the height of the road surface with reference to a portion of the movable body.

10. An image processing method to be performed by an image processing apparatus, image processing method comprising:
acquiring a surrounding image of a moveable body;
overlaying a display indicating a course trajectory of a specific portion of the moveable body in a travel direction of the moveable body on the surrounding image at a position corresponding to a height of the specific portion from a road surface;
changing the display indicating the course trajectory when an obstacle, included in the surrounding image and present in the travel direction of the moveable body, and the course trajectory of the specific portion are in contact; and
correcting the display indicating the course trajectory based on a correction value that is calculated based on a change in a height of the road surface.

11. The method of claim 10, wherein
the correcting corrects the display indicating the course trajectory based on the correction value that is calculated based on the change in the height of the road surface with reference to a portion of the movable body.

* * * * *